United States Patent
Mansueto

(10) Patent No.: US 9,688,129 B2
(45) Date of Patent: Jun. 27, 2017

(54) VEHICLE WINDSHIELD COVER AND METHOD THEREFOR

(71) Applicant: Raul Mansueto, Las Vegas, NV (US)

(72) Inventor: Raul Mansueto, Las Vegas, NV (US)

( * ) Notice: Subject to any disclaimer, the term of this patent is extended or adjusted under 35 U.S.C. 154(b) by 0 days.

(21) Appl. No.: 14/954,420

(22) Filed: Nov. 30, 2015

(65) Prior Publication Data
US 2017/0021711 A1    Jan. 26, 2017

Related U.S. Application Data

(63) Continuation-in-part of application No. 14/806,483, filed on Jul. 22, 2015.

(51) Int. Cl.
*B60J 11/08* (2006.01)
*G09F 17/00* (2006.01)

(52) U.S. Cl.
CPC ......... *B60J 11/08* (2013.01); *G09F 2017/005* (2013.01)

(58) Field of Classification Search
CPC ............................ B60J 11/08; G09F 2017/005
USPC .............. 160/368.1, 370.21; 40/604, 606.09
See application file for complete search history.

(56) References Cited

U.S. PATENT DOCUMENTS

| | | | | |
|---|---|---|---|---|
| 3,537,201 A | * | 11/1970 | Friedrichsen | G09F 17/00 40/604 |
| 3,678,886 A | * | 7/1972 | Tibbet | G09F 17/00 116/173 |
| 4,862,943 A | * | 9/1989 | Shafia | B60J 1/2091 160/370.21 |
| 4,893,668 A | * | 1/1990 | Nomura | B60J 1/2011 160/327 |
| 4,966,405 A | * | 10/1990 | Tremaine | B60J 11/08 160/370.21 |
| 5,694,998 A | * | 12/1997 | Chen | B60J 1/2011 160/327 |
| D480,248 S | * | 10/2003 | Finison | D6/575 |
| 8,342,226 B2 | * | 1/2013 | Zheng | B60J 1/2011 160/370.21 |
| 8,430,445 B1 | * | 4/2013 | Williams | B60J 11/08 150/168 |
| 2004/0227373 A1 | * | 11/2004 | Robbins | B60J 11/08 296/95.1 |

* cited by examiner

*Primary Examiner* — Blair M Johnson
(74) *Attorney, Agent, or Firm* — Weiss & Moy, P.C.; Jeffrey D. Moy

(57) ABSTRACT

A window shield cover for a vehicle has a cover member shaped to be place on top of and cover an exterior of a windshield of the vehicle. A first attachment strip is removably attached to the cover member. The first attachment strip extends past a first edge and a second edge of the cover member. A second attachment strip is removably attached to the cover member. The second attachment strip extends past the first edge and the second edge of the cover member. An element collector covers a front surface of the cover member.

11 Claims, 4 Drawing Sheets

VEHICLE WINDSHIELD COVER AND METHOD THEREFOR

TECHNICAL FIELD

The present application generally relates to a windshield cover, and more specifically, to a protective, external, cover for the windshield of a vehicle to prevent snow and ice from cumulating on the windshield as well as to protect the interior of the vehicle from damage that may be caused by sunlight.

BACKGROUND

Window shades are devices that are placed on the internal dashboard of the windshield. Window shades are primarily used to cover a windshield to block the sunlight. By blocking the sunlight, the window shades help to protect the interior of the vehicle from damage due to exposure to sunlight. Blocking the sunlight may further help to reduce the interior temperature of the vehicle. This may be important especially is desert areas where the temperature may reach 110° F. or more.

There are also window shades that may be placed on the exterior of the windshield. Exterior window shades are generally designed to prevent frost, snow and ice from building up on the windshield during cold periods or in a cold climate. The covering of the windshield in a cold climate helps to alleviate some of the scraping, cleaning and deicing that may be necessary if the windshield was left open to the environment. Exterior window shades may also be used in a similar manner to internal window shades to block the sunlight from entering the interior of the vehicle thereby protecting the interior of the vehicle from damage due to exposure to sunlight.

While exterior window shades do work to prevent frost, snow and ice from building up on the windshield during cold periods or in a cold climate, as well as, to block the sunlight from entering the interior of the vehicle to protect the interior of the vehicle from damage due to exposure to sunlight, they have several problems. First, most external window shades cannot be secured to the vehicle. Thus, most external window shades may blow away during stormy conditions or be removed by vandals, pranksters, thieves and/or likeminded individuals. Further, current exterior window shades do not have any way to easily pick-up and store the window shade. It would thus be desirable to provide an exterior window shade that addresses the aforementioned shortcomings of existing devices.

SUMMARY

In accordance with one embodiment, a window shield cover for a vehicle is disclosed. The window shield has a cover member shaped to be place on top of and cover an exterior of a windshield of the vehicle. A first attachment strip is removably attached to the cover member. The first attachment strip extends past a first edge and a second edge of the cover member. A second attachment strip is removably attached to the cover member. The second attachment strip extends past the first edge and the second edge of the cover member. An element collector covers a front surface of the cover member.

In accordance with one embodiment, a window shield cover for a vehicle is disclosed. The window shield cover for a vehicle has a cover member shaped to be place on top of and cover an exterior of a windshield of the vehicle. A first attachment strip is removably attached to the cover member. The first attachment strip has ends configured to be positioned between a front driver door and a frame of the vehicle and a front passenger door and the frame of the vehicle. A second attachment strip is removably attached to the cover member. The first attachment strip has ends configured to be positioned between the front driver door and the frame of the vehicle and the front passenger door and the frame of the vehicle. A container is attached to a rear surface of the cover member. A draw string is formed around a perimeter of the container and configured to draw the cover member into the container when pulled. An element collector covers a front surface of the cover member.

In accordance with one embodiment, a window shield cover for a vehicle is disclosed. The window shield cover has a cover member shaped to be place on top of and cover an exterior of a windshield of the vehicle. A first attachment strip is removably attached to the cover member. The first attachment strip has ends configured to be positioned between a front driver door and a frame of the vehicle and a front passenger door and the frame of the vehicle. A second attachment strip is removably attached to the cover member. The second attachment strip has ends configured to be positioned between the front driver door and the frame of the vehicle and the front passenger door and the frame of the vehicle. A locking device secures the first attachment strip and the second attachment strip to the cover member. The locking device comprises a plurality of cover member openings; at least one first attachment strip opening, the at least one first attachment strip opening aligned with one of the plurality of cover member openings when the first attachment strip is attached to the cover member; at least one second attachment strip opening, the at least one second attachment strip opening aligned with one of the plurality of cover member openings when the second attachment strip is attached to the cover member; and a securing device positioned through the at least one first attachment strip opening aligned with one of the plurality of cover member openings when the first attachment strip is attached to the cover member and through the at least one second attachment strip opening aligned with one of the plurality of cover member openings when the second attachment strip is attached to the cover member. A container is attached to a rear surface of the cover member. A draw string is formed around a perimeter of the container and configured to draw the cover member into the container when pulled. An element collector covers a front surface of the cover member.

BRIEF DESCRIPTION OF THE DRAWINGS

The present application is further detailed with respect to the following drawings. These figures are not intended to limit the scope of the present application but rather illustrate certain attributes thereof.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure Embodiments of the exemplary system and method provide an external windshield cover for a vehicle to prevent frost, snow and ice from building up on the windshield during cold periods or in a cold climate, as well as, to block the sunlight from entering the interior of the vehicle to protect the interior of the vehicle from damage due to exposure to sunlight, that is secured to the vehicle. The external windshield cover may be removed by unlocking and opening a driver and front passenger door. The external windshield cover may be easily lifted off of the windshield and stored in attached storage container.

Figure 1:
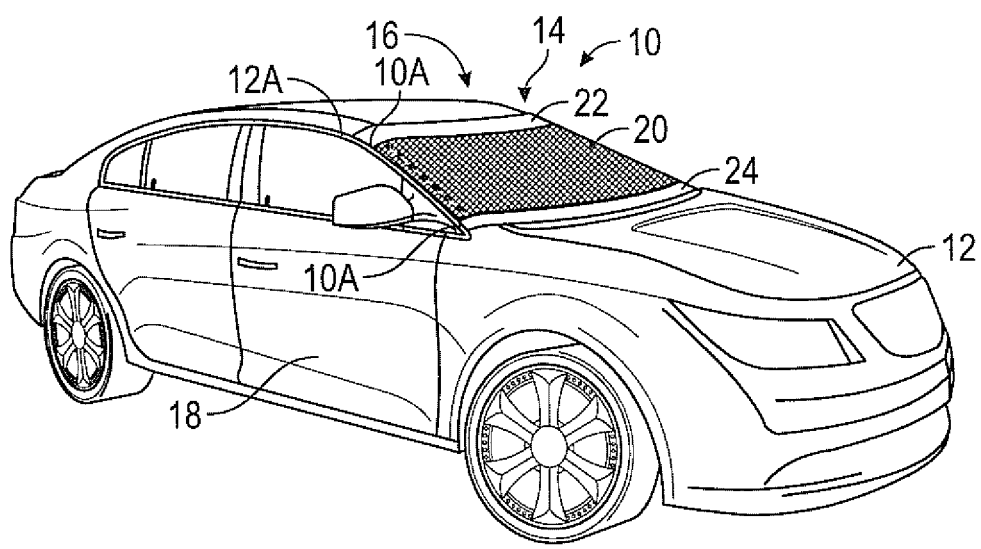
FIG. 1 is a perspective view of an external window cover place on a windshield of a vehicle according to one aspect of the present application.
Figure 2:
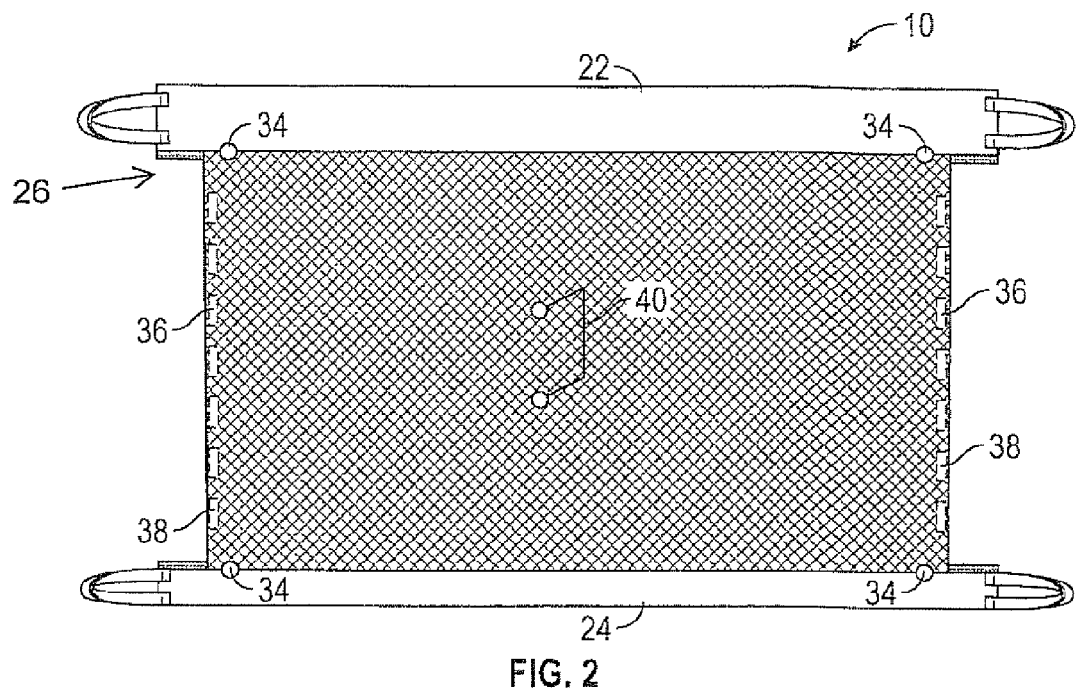
FIG. 2 is a front view of the external window cover depicted in FIG. 1 in accordance with one aspect of the present application.
Figure 3:
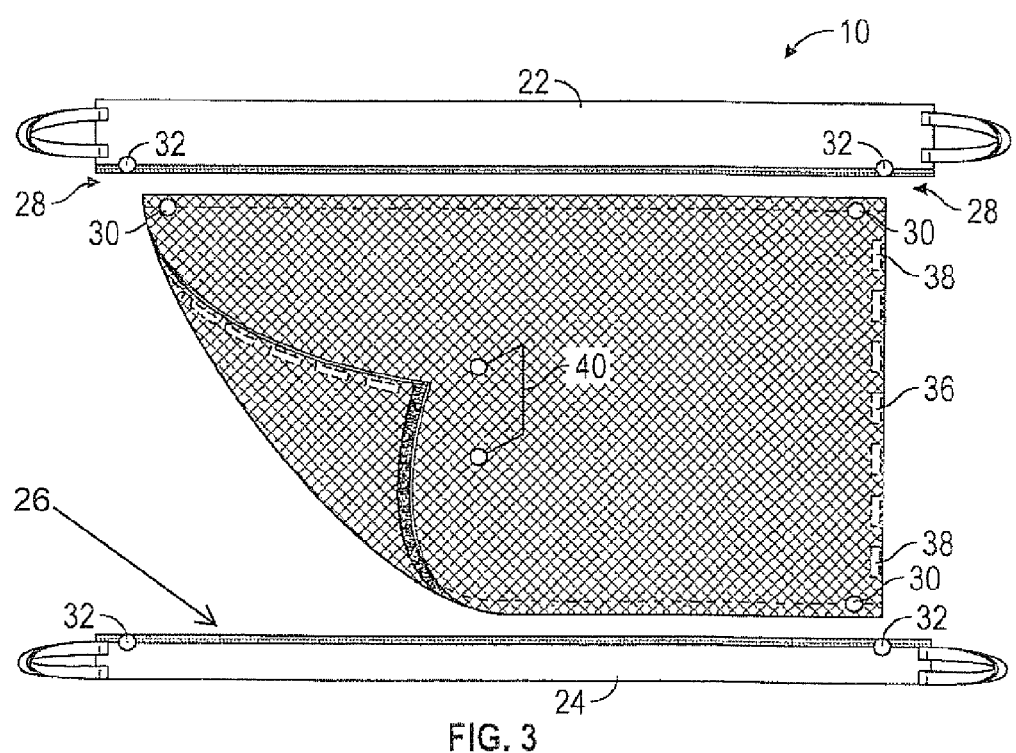
FIG. 3 is an exploded front view of the external window cover depicted in FIG. 1 in accordance with one aspect of the present application.
Figure 4:
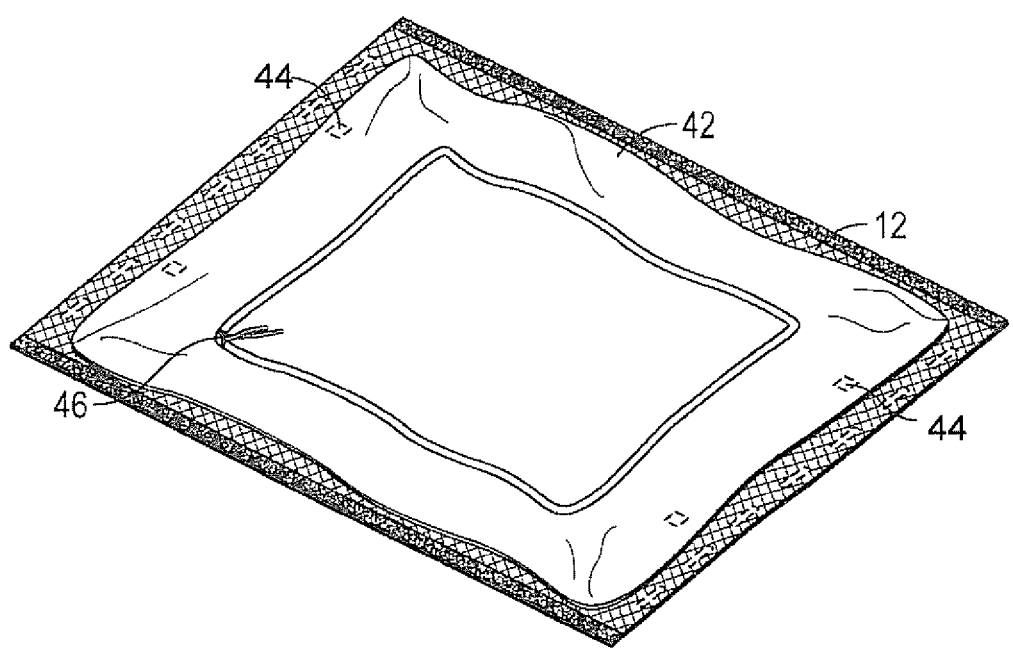
FIG. 4 is a rear view of the external window cover depicted in FIG. 1 in accordance with one aspect of the present application.

Referring to FIG. 1, windshield cover 10 is shown. The windshield cover 10 is placed on the exterior of a vehicle 12 to cover a windshield 14 of the vehicle 12. The windshield cover 10 may be to prevent frost, snow and ice from building up on the windshield 14 during cold periods or in a cold climate, as well as, to block the sunlight from entering the interior of the vehicle 12 to protect the interior of the vehicle from damage due to exposure to sunlight. The windshield cover 10 is secured to the vehicle 12 to prevent theft by inserting side members 10A of the windshield cover 10 between a front driver door 16 and a frame 12A of the vehicle 12 and a front passenger door 18 and the frame 12A of the vehicle 12.

Referring to FIGS. 1-4, the windshield cover 12 has a cover member 20. The cover member 20 is shaped to place on top of and cover the exterior of the windshield 14 of the vehicle 12. In accordance with one embodiment, the windshield cover 12 is trapezoidal in shape. However, this is given as an example and should not be seen in a limiting manner. The cover member 20 may be formed in any shaped that is able to be place on top of and cover the exterior of the windshield 14 of the vehicle 12. The cover member 20 may be formed of lightweight flexible material that is waterproof. In accordance with one embodiment, the cover member 20 is formed of a durable Mylar coated bubble wrap with a plastic or cardboard stiffener. However, this is only given as an example and other materials may be used without departing from the spirit and scope of the present disclosure.

The windshield cover 10 may have a first fastener strip 22 and a second fastener strip 24. The first fastener strip 22 may be attached to a top area of the cover member 20. The first fastener strip 22 may be an elongated member which extends past a top left and right side edges of the cover member 20. The first fastener strip 22 is configured to be inserted into the area between the driver door and the front passenger door of the vehicle 10.

The second fastener strip 24 may be attached to a bottom area of the cover member 20. The second fastener strip 24 may be an elongated member which extends past a bottom left and right side edges of the cover member 20. The second fastener strip 24 is configured to be inserted into the area between the driver door and the front passenger door of the vehicle 10.

The first fastener strip 22 and the second fastener strip 24 may be removably attached to the cover member 20. Attachment devices 26 may be used to removably attach the first fastener strip 22 and the second fastener strip 24 to the cover member 20. The attachment device 26 may be hook and loop material, male/female connectors, snaps, and the like. The aforementioned are given as examples and should not be seen in a limiting manner. Other types of attachment devices may be used without departing from the spirit and scope of the present invention.

A locking mechanism 28 may be used to secure the first fastener strip 22 and the second fastener strip 24. In accordance with one embodiment, one or more openings 30 may be formed in the cover member 20. Corresponding openings 32 may be formed in the first fastener strip 22 and the second fastener strip 24. When the first fastener strip 22 and the second fastener strip 24 are properly attached to the cover member 22, the openings 30 in the cover member 20 will align with the corresponding openings 32 formed in the first fastener strip 22 and the second fastener strip 24. A securing device 34 may be placed through the aligned openings 30 and 32. The securing device 34 may be a padlock, zip ties, or other locking devices.

Weights 36 may be inserted into the cover member 20. The weights 36 may be placed around an outer perimeter of the cover member 20. The weights 36 may be used to keep the windshield cover 10 secure against the vehicle 12. Alternatively, or in addition to, magnets 38 may be inserted into the cover member 20. The magnets 38 may be placed around an outer perimeter of the cover member 20. The magnets 38 may be used to keep the windshield cover 10 secure against the vehicle 12.

One or more handles 40 may be attached to a front surface of the cover member 20. The handles 40 may allow an individual to lift and remove the windshield cover 10 away from the vehicle 12. The handles 40 may extend above the top surface of the cover member 20. By extending upwards, the handles 40 may protrude through snow that may have accumulated on the top surface of the cover member 20. In accordance with one embodiment, the handles 40 are formed and/or covered with a heat resistant material. Thus, when the windshield cover 10 is used to block the sunlight from entering the interior of the vehicle 12, the handles 40 will be able to be grabbed by a user.

The windshield cover 10 may have a container 42. The container 42 may be made out of a lightweight water resistant material such as nylon or the like. The above is given as an example and should not be seen in a limiting manner. Other materials may be used without departing from the spirit and scope of the present invention. The container 42 may be attached to a rear surface of the cover member 20.

The container 42 may be attached so as to remain approximately flat against the rear surface of the cover member 20. In accordance with one embodiment, attachment devices 44 may be used to attach the container 42 approximately flat against the rear surface of the cover member 20. The attachment devices 44 may be hook and loop material, snaps, or the like.

A draw string 46 may be inserted around a perimeter of the container 42. When the windshield cover 10 is removed from the vehicle 10, pulling the draw string 46 draws the cover member 20 into the container 42 for storage. If the first fastener strip 22 and the second fastener strip 24 are still attached to the cover member 20, the first fastener strip 22 and the second fastener strip 24 may be drawn into the container 42 for storage as well.

Figure 5:
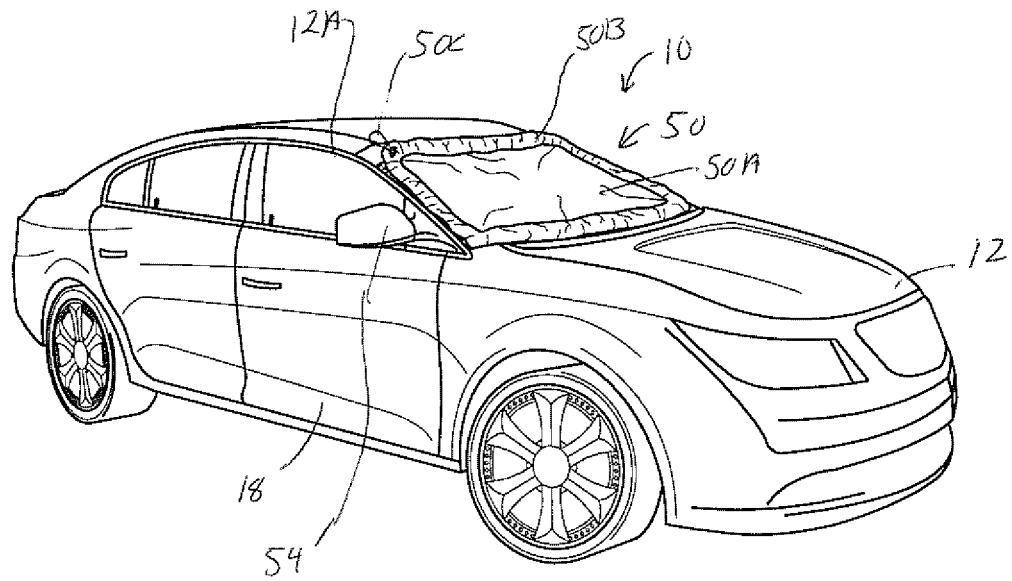
FIG. 5 is a perspective view of an external window cover place on a windshield of a vehicle according to one aspect of the present application.
Figure 6:
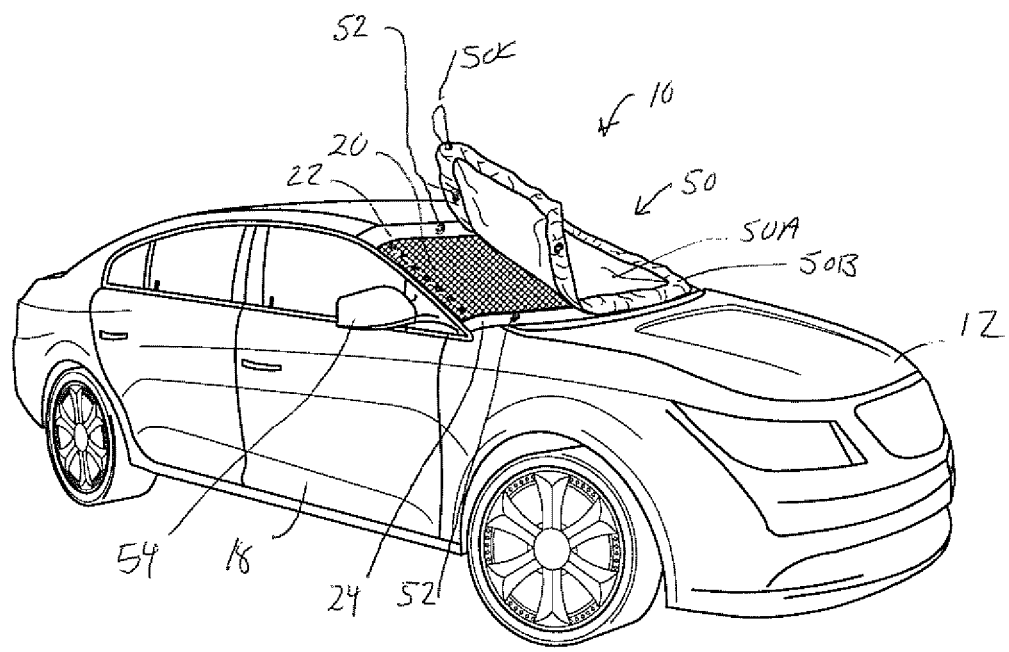
FIG. 6 is a perspective view of the external window cover depicted in FIG. 5 with an element collector being removed from the external window cover according to one aspect of the present application.

Referring to FIGS. 5 and 6, the window cover 10 may have an element collector 50. The element collector 50 may be used to cover the front surface of the cover member 20. The element collector 50 may collect and hold any debris that falls onto the window cover 10. For example, the element collector 50 may collect and hold any snow, leaves, and other debris that may fall onto the window cover 10.

The element collector 50 may be made out of a lightweight water resistant material. For example, plastic material, similar to that of plastic grocery bags, such high-density polyethylene (HDPE), low-density polyethylene (LDPE), linear low-density polyethylene (LLDPE) or the like may be used. The above is given as an example and should not be seen in a limiting manner. Other materials may be used without departing from the spirit and scope of the present invention.

The element collector 50 may have a flat planer member 50A. A raised trim 50B may be formed around an outer perimeter of the flat planer member 50A. The raised trim 50B may be used hold any debris that falls onto flat planer member 50A. A draw string 50C may be inserted within the raised trim 50B formed around the outer perimeter of the flat planer member 50A. The draw string 50C may be used to secure the element collector 50 to the vehicle 12. The draw string 50C may be placed around a side mirror 54 to secure the element collector 50 to the vehicle 12. Alternatively, the draw string 50C may be placed between the front driver door 16 and a frame 12A of the vehicle 12 and a front passenger door 18 and the frame 12A of the vehicle 12.

When the element collector 50 is removed from the front surface of the cover member 20, the user may lift the element collector 50 away from the front surface of the cover member 20 as shown in FIG. 6. The user may then pull the draw string 50C closing the debris within the element collector 50. The user may then discard the element collector 50 and the collected debris content stored within the closed element collector 50. A new element collector 50 may then be removably attached to the front surface of the cover member 20 and/or the first and second fastener strips 22 and 24 respectively.

The element collector 50 may be removably attached to the front surface of the cover member 20 and/or the first and second fastener strips 22 and 24 respectively. The element collector 50 may be attached so as to remain approximately flat against the front surface of the cover member 20. In accordance with one embodiment, attachment devices 52 may be used to attach the element container 50 approximately flat against the front surface of the cover member 20. The attachment devices 52 may be hook and loop material, snaps, or the like.

The foregoing description is illustrative of particular embodiments of the application, but is not meant to be a limitation upon the practice thereof. The following claims, including all equivalents thereof, are intended to define the scope of the application.

What is claimed is:

1. A window shield cover for a vehicle comprising:
   a cover member shaped to be place on top of and cover an exterior of a windshield of the vehicle;
   a first attachment strip removably attached to the cover member, the first attachment strip extending past a first edge and a second edge of the cover member;
   a second attachment strip removably attached to the cover member, the second attachment strip extending past the first edge and the second edge of the cover member;
   a locking device to secure the first attachment strip and the second attachment strip to the cover member; and
   a element collector covering a front surface of the cover member, wherein the element collector removably comprises:
   a planer member; and
   a raised trim formed around an outer perimeter of the planer member.

2. The window shield cover of claim 1, wherein the element collector further comprises a draw string inserted within the raised trim.

3. The window shield cover of claim 1, wherein the element collector further comprises attachment devices for removably attaching the element collector from at least one of the cover member, first attachment strip, or a second attachment strip.

4. The window shield cover of claim 1, comprising at least one handle formed on a front surface of the cover member.

5. The window shield cover of claim 4, wherein the at least one handle is covered in a heat resistant material.

6. The window shield cover of claim 1, wherein the locking device comprises:
   a plurality of cover member openings;
   at least one first attachment strip opening, the at least one first attachment strip opening aligned with one of the plurality of cover member openings when the first attachment strip is attached to the cover member;
   at least one second attachment strip opening, the at least one second attachment strip opening aligned with one of the plurality of cover member openings when the second attachment strip is attached to the cover member; and
   a securing device positioned through the at least one first attachment strip opening aligned with one of the plurality of cover member openings when the first attachment strip is attached to the cover member and through the at least one second attachment strip opening aligned with one of the plurality of cover member openings when the second attachment strip is attached to the cover member.

7. The window shield cover of claim 1, comprising weighted members positioned around a perimeter of the cover member.

8. The window shield cover of claim 1, comprising magnets members positioned around a perimeter of the cover member.

9. A window shield cover for a vehicle comprising:
   a cover member shaped to be place on top of and cover an exterior of a windshield of the vehicle;
   a first attachment strip removably attached to the cover member, the first attachment strip having ends configured to be positioned between a front driver door and a frame of the vehicle and a front passenger door and the frame of the vehicle;
   a second attachment strip removably attached to the cover member, the second attachment strip having ends configured to be positioned between the front driver door and the frame of the vehicle and the front passenger door and the frame of the vehicle;
a locking device to secure the first attachment strip and the second attachment strip to the cover member, wherein the locking device comprises:
 a plurality of cover member openings;
 at least one first attachment strip opening, the at least one first attachment strip opening aligned with one of the plurality of cover member openings when the first attachment strip is attached to the cover member;
 at least one second attachment strip opening, the at least one second attachment strip opening aligned with one of the plurality of cover member openings when the second attachment strip is attached to the cover member; and
 a securing device positioned through the at least one first attachment strip opening aligned with one of the plurality of cover member openings when the first attachment strip is attached to the cover member and through the at least one second attachment strip opening aligned with one of the plurality of cover member openings when the second attachment strip is attached to the cover member; and
a element collector covering a front surface of the cover member, wherein the element collector comprises:
 a planer member;
 a raised trim formed around an outer perimeter of the planer member; and
 a draw string inserted within the raised trim.

10. The window shield cover of claim 9, wherein the element collector further comprises attachment devices for removably attaching the element collector from at least one of the cover member, first attachment strip, or a second attachment strip.

11. The window shield cover of claim 9, comprising:
 at least one handle formed on a front surface of the cover member, wherein the at least one handle is covered in a heat resistant material; and
 weighted members positioned around a perimeter of the cover member.

* * * * *